(12) United States Patent
Gunn et al.

(10) Patent No.: US 8,280,462 B2
(45) Date of Patent: Oct. 2, 2012

(54) DISTRIBUTED SOUND ENHANCEMENT

(75) Inventors: Raymond W. Gunn, Shelby Township, MI (US); Michael A. Hayes, Bloomfield Hills, MI (US)

(73) Assignee: Clarity Technologies, Inc., Troy, MI (US)

( * ) Notice: Subject to any disclaimer, the term of this patent is extended or adjusted under 35 U.S.C. 154(b) by 0 days.

(21) Appl. No.: 12/948,117

(22) Filed: Nov. 17, 2010

(65) Prior Publication Data

US 2011/0116620 A1 May 19, 2011

Related U.S. Application Data

(62) Division of application No. 10/896,300, filed on Jul. 21, 2004, now Pat. No. 7,856,240.

(60) Provisional application No. 60/577,631, filed on Jun. 7, 2004.

(51) Int. Cl.
*H04M 1/00* (2006.01)

(52) U.S. Cl. .............. 455/575.2; 455/63.1; 455/569.1; 455/41.2; 455/556.1; 379/390.02; 379/406.04; 379/387.01; 379/390.04; 381/1; 381/71.6; 381/74; 381/92; 381/103; 704/270; 715/255

(58) Field of Classification Search .............. 455/63.1, 455/569.1, 575.2, 41.2, 556.1; 379/390.2, 379/406.04, 387.01, 390.04; 381/1, 71.6, 381/74, 92, 98, 103; 704/270; 715/255
See application file for complete search history.

(56) References Cited

U.S. PATENT DOCUMENTS

| | | | | |
|---|---|---|---|---|
| 4,682,957 | A * | 7/1987 | Young | 434/307 R |
| 5,721,783 | A * | 2/1998 | Anderson | 381/328 |
| 5,892,830 | A * | 4/1999 | Klayman | 381/1 |
| 6,597,791 | B1 * | 7/2003 | Klayman | 381/1 |
| 6,745,014 | B1 | 6/2004 | Seibert et al. | |
| 7,039,179 | B1 * | 5/2006 | Gerhardt et al. | 379/390.02 |
| 7,136,684 | B2 * | 11/2006 | Matsuura et al. | 455/575.2 |
| 7,283,635 | B1 * | 10/2007 | Anderson et al. | 381/74 |
| 2001/0050993 | A1 | 12/2001 | Douglas | |
| 2003/0100274 | A1 | 5/2003 | Brown | |
| 2003/0130016 | A1 * | 7/2003 | Matsuura et al. | 455/569 |
| 2004/0005063 | A1 * | 1/2004 | Klayman | 381/1 |
| 2004/0015775 | A1 * | 1/2004 | Simske et al. | 715/500 |
| 2004/0122664 | A1 | 6/2004 | Lorenzo et al. | |
| 2005/0286713 | A1 * | 12/2005 | Gunn et al. | 379/406.04 |
| 2007/0053522 | A1 * | 3/2007 | Murray et al. | 381/71.6 |
| 2007/0147633 | A1 * | 6/2007 | Burger | 381/92 |
| 2008/0013741 | A1 * | 1/2008 | Klayman | 381/1 |
| 2008/0103776 | A1 * | 5/2008 | Kumar et al. | 704/270 |
| 2009/0074206 | A1 | 3/2009 | Bradford et al. | |
| 2009/0074214 | A1 | 3/2009 | Bradford et al. | |
| 2009/0076825 | A1 | 3/2009 | Bradford et al. | |

FOREIGN PATENT DOCUMENTS

JP 2004303349 A 10/2004

* cited by examiner

*Primary Examiner* — April G Gonzales
(74) *Attorney, Agent, or Firm* — Brooks Kushman P.C.

(57) ABSTRACT

Sound quality is enhanced in a sound system including handsets and headsets. Handset sound enhancing algorithms are implemented in a handset. The handset automatically determines which, if any, of a plurality of headset sound enhancing algorithms are active in a headset in communication with the handset. The handset determines how to use the handset sound enhancing algorithms in a sound processing channel based on which of the headset sound enhancing algorithms are active in the headset.

10 Claims, 6 Drawing Sheets

DISTRIBUTED SOUND ENHANCEMENT

CROSS-REFERENCE TO RELATED APPLICATIONS

This application is a divisional of U.S. application Ser. No. 10/896,300, filed Jul. 21, 2004, which claims the benefit of U.S. provisional application Ser. No. 60/577,631 filed Jun. 7, 2004, titled "Distributed Sound Enhancement," which is hereby incorporated by reference in its entirety.

BACKGROUND OF THE INVENTION

1. Field of the Invention

The present invention relates to enhancing sound along communication channels in multiple communication devices.

2. Background Art

Telecommunication devices are increasing in number, functionality, portability and options provided. Telephones may be interconnected by any combination of traditional telephone wires, wireless radio signals, the Internet, satellites, and the like. Devices such as computers, personal digital assistants (PDAs), entertainment systems, and the like, are increasingly taking on communication functions traditionally assigned to telephones. For example, automotive vehicles incorporate telematics to provide communication services to occupants including telephone calls, driver assistance, emergency location, entertainment, and the like.

Telecommunication devices operate in a wide range of environments. These environments can degrade or corrupt sound quality through distortion of the sound signal, addition of unwanted noise, acoustic echo, and the like. In addition, the transmission channel itself may distort the sound signal due to bandwidth limitations, nonlinearities, line echo, sampling, and the like.

Many telecommunication devices incorporate sound enhancement processing to correct or compensate for various sound degrading effects. Often, the optimal place to locate sound enhancement processing is as close to the end of the communication channel as possible. Some sound processing is more optimally placed nearer to the source of the sound or at the beginning of the communication channel. Still other sound processing techniques are better placed within the communication channel itself.

The proliferation of telecommunication devices has created a desire to mix and match various equipment. For example, wired and wireless headsets are available for use with many different types of telecommunications transceivers. As telecommunication devices are made more complex and powerful there is an increasing tendency to incorporate sound enhancement processing on each device. Thus it is likely that sound enhancement efforts will be duplicated on interconnected telecommunication devices that form a common communication channel.

SUMMARY OF THE INVENTION

The present invention avoids duplicating sound enhancement processing by selectively determining in which device various sound enhancement algorithms will be used. These devices include sound transducing devices, typically including one or more microphones and/or speakers, and interface devices capable of communicating over intercommunication systems.

The present invention includes a system for enhancing sound quality. A handset implements a handset suite of cooperating sound enhancement algorithms. Each handset sound enhancement algorithm in the suite can be either placed in-channel for sound processing or removed from in-channel sound processing. Any of a plurality of headsets can communicate with the handset. Each headset implements a headset suite of cooperating sound enhancement algorithms. Different headsets are capable of implementing different suites of sound enhancement algorithms, permitting different levels sound quality and cost in the headset market. When communicating with a handset, each headset notifies the handset of its headset suite. The handset selectively places each handset sound enhancement algorithm in-channel based on receiving notification of the headset suite for a headset in communication with the handset.

In an embodiment of the present invention, at least one headset does not implement a suite of cooperating sound enhancement algorithms. The handset, when in communication with one of these headsets, is able to recognize that the headset does not implement a suite of cooperating sound enhancement algorithms and to then selectively place predetermined handset sound enhancement algorithms in-channel based on the recognition.

In another embodiment of the present invention, each headset in at least a subset of the headsets can either selectively place at least one of the headset sound enhancement algorithms in the headset suite of cooperating sound enhancement algorithms in-channel, remove the at least one sound enhancement algorithms from in-channel processing and/or adjust at least one parameter in at least one headset algorithm. This selection, removal and/or adjustment may be based on a signal transmitted from the handset.

A method for enhancing sound quality in a communication system is also provided. Handset sound enhancing algorithms are implemented in a handset. Each handset sound enhancing algorithm may be used in a sound processing channel. The handset automatically determines which, if any, of a plurality of headset sound enhancing algorithms are active in a headset in communication with the handset. The handset determines which handset sound enhancing algorithms to use in the sound processing channel based on which of the headset sound enhancing algorithms are active in the headset. Thus, duplicative sound enhancement processing in both the handset and the headset is avoided.

In an embodiment of the present invention, the method further includes selectively enabling, disabling or modifying the parameters of at least one headset sound enhancing algorithm in the headset based on a signal received from the handset.

A method of reducing duplicative sound enhancement processing in a communication channel implemented in a handset and a headset in communication with the handset is also provided. Sound enhancement processing is divided into a plurality of cooperating algorithms. At least a subset of the cooperating algorithms are implemented in the headset. An indication of the implemented subset is transmitted from the headset to the handset. This allows the handset to selectively determine a second subset of the cooperating algorithms to use in processing the communication channel so as to avoid repeating sound enhancement processing implemented in the headset.

In an embodiment of the present invention, a control signal is received in the headset from the handset. At least one of the cooperating algorithms in the headset is selectively disabled or adjusted based on the received control signal.

A method of marketing sound enhancement technology is also provided. The sound enhancement technology is divided into a plurality of cooperating sound processing algorithms.

Each sound processing algorithm is capable of being selectively added or removed from a sound processing channel. A charge is collected for the use in at least one headset of at least a subset of the cooperating sound processing algorithms. The plurality of sound processing algorithms are freely offered for use in handsets. Each handset receives information from a headset in communication with the handset and selectively adds or removes each sound processing algorithm from a sound processing channel implemented within the handset based on the received information.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
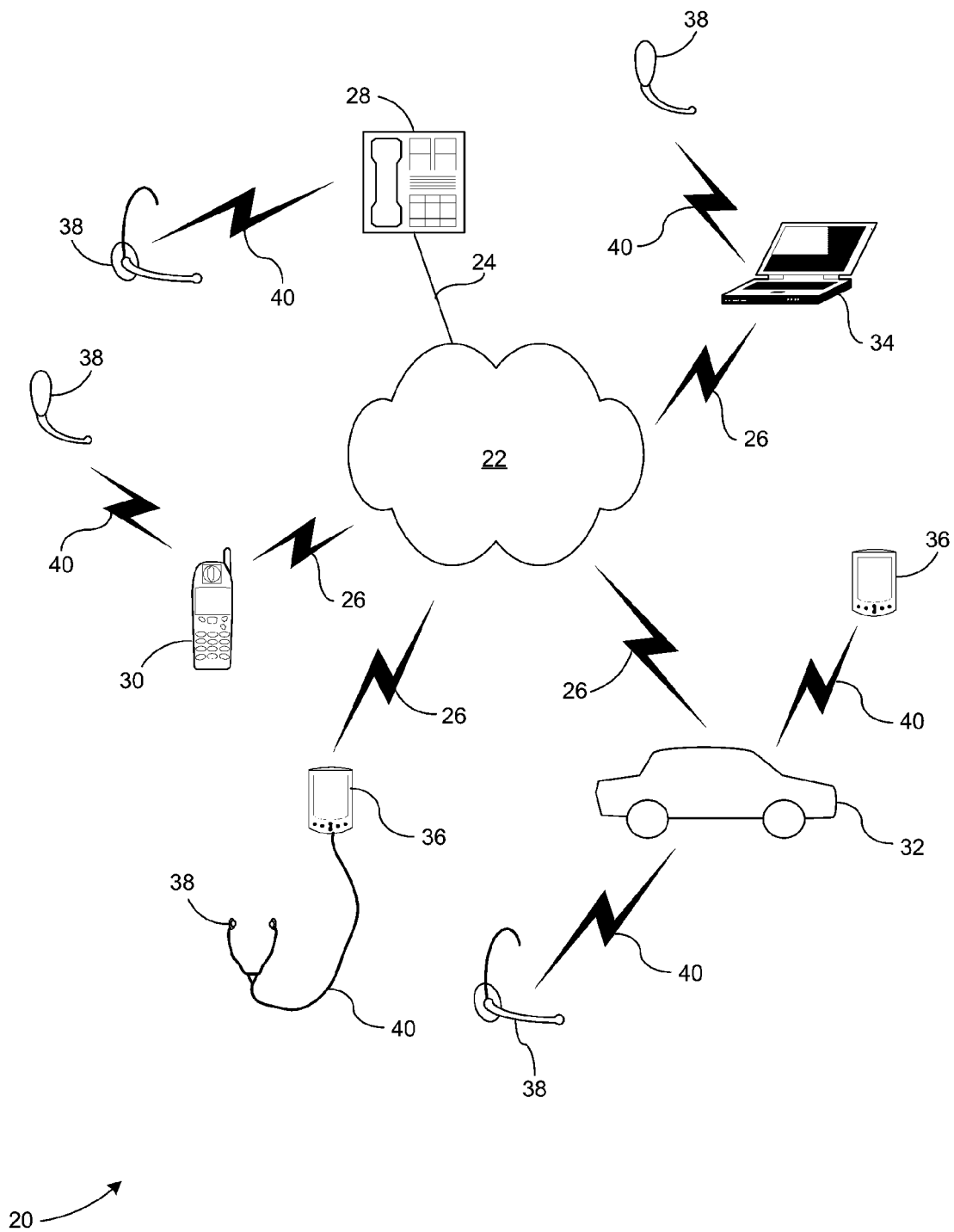
FIG. 1 is a block diagram illustrating a telecommunication system capable of implementing the present invention.

Referring now to FIG. 1, a block diagram illustrating a telecommunication system capable of implementing the present invention is shown. A telecommunication system, shown generally by 20, including interconnection system 22. Interconnection system 22 can include one or more of wired telephone connections, wireless telephone connections, voice over IP, satellite communication, and the like. Telecommunication devices connect to interconnection system 22 through wireline connections 24 and/or wireless connections 26. Telecommunication devices include traditional wireline set 28, wireless set 30, telematics in vehicle 32, personal computer 34, personal digital assistant 36, entertainment systems such as MP3 players, hands-free kit in vehicle 32, and the like. For simplicity, such devices will be referred to as handsets. Some telecommunication devices connect to handsets via wired or wireless links for the purpose of providing additional functionality such as hands free operation, increased mobility, increased privacy, stereo audio reproduction, improved microphones, improved speakers, and the like. For simplicity, such devices will be referred to headsets 38.

Headset 38 typically includes at least one microphone and at least one speaker. Multiple microphones may be included for certain functionality, such as noise cancellation. Multiple speakers may be included to provide stereo sound, provide acoustic transducers with different frequency characteristics, and the like. In addition to traditional microphone and speaker combinations, headsets 38 may include any telecommunications device receiving sound or producing sound, such as personal digital assistants 36, personal computers 34, entertainment systems such as MP3 players, hands-free kit in vehicle 32, and the like.

Headsets 38 are typically designed to operate with a wide variety of handset devices. Wired headsets 38 typically include a standardized connector for plugging into, for example, wireless phone 30. Increasingly popular are handsets that include wireless link 40 for connection with headsets 38. The wireless link 40 may utilize infrared light, as specified in standards such as IrDA, or may utilize radio frequency radiation, as specified in standards such as Bluetooth, IEEE 802.11, IEEE 802.15, and the like.

Headsets 38 increasingly include functionality to improve sound quality. This functionality may include sound enhancement processing such as acoustic echo canceling, noise cancellation, frequency extension, dynamic audibility enhancement, acoustic shock protection, and the like. Since headsets 38 are designed to work with various handsets, and since these handsets may also implement sound enhancement processing, duplication of sound processing functionality may occur. This duplication can result in overprocessing, a condition that often leads to poorer perceived sound quality than if no enhancement processing had been performed. Therefore, in order to gain the fullest effects of headset and handset interchangeability, control over which devices will apply various enhancement algorithms is needed. This control may include adjusting parameters between corresponding algorithms in the handset and headset.

Figure 2:
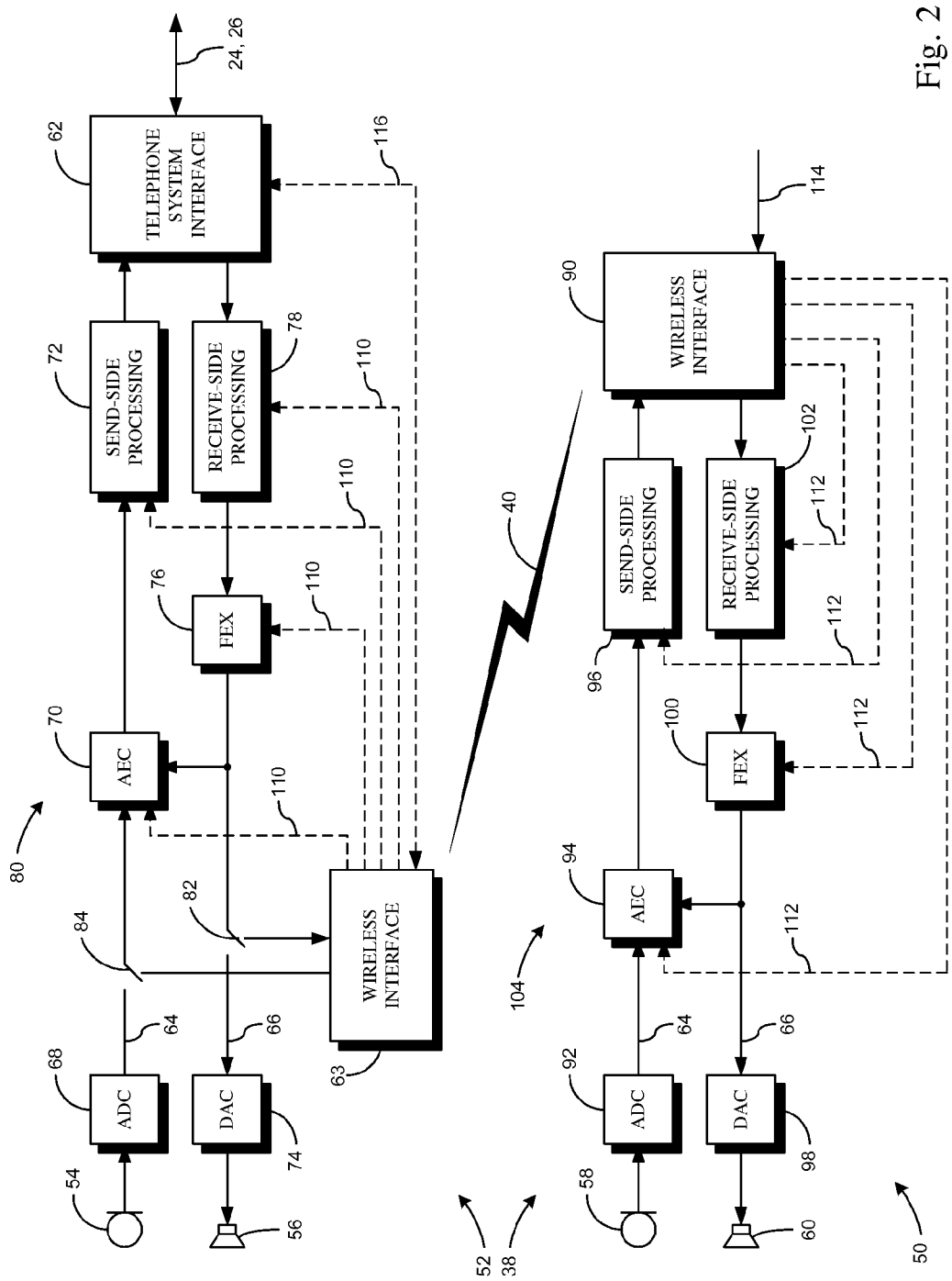
FIG. 2 is a block diagram illustrating a handset and a headset according to an embodiment of the present invention.

Referring now to FIG. 2, a block diagram illustrating a handset and a headset according to an embodiment of the present invention is shown. A system for enhancing sound quality, shown generally by 50, includes a handset, shown generally by 52, and a headset, shown generally by 38. Handset 52 typically includes at least one microphone 54 for converting sound into electrical signals and at least one speaker 56 for converting electrical signals into sound. Likewise, headset 38 typically includes at least one microphone 58 and at least one speaker 60.

However, as will be recognized by one of ordinary skill in the art, either device may include more than one microphone, more than one speaker, no microphones or no speakers. For example, if system 50 is an entertainment system, such as an MP3 player, headset 38 may have two speakers and no microphones and handset 52 may have neither microphones nor speakers. As another example, headset 38 may have multiple microphones for improved noise cancellation.

Handset 52 typically includes system interface 62 for connecting handset 52 with interconnection system 22 through wireline connection 24 or wireless connection 26. The present invention will work with standard telecommunication systems 22 for carrying voice and data as well as with systems 22 designed to carry only data or only voice signals. Handset 52 also includes wireless interface 63 for wirelessly communicating with headset 38 over wireless link 40. As will be recognized by one of ordinary skill in the art, wireless interface 63 may be replaced or augmented with a port for wired connection to headset 38.

Handset 52 implements a collection of sound enhancement algorithms. In the embodiment illustrated in FIG. 2, sound enhancement is implemented on both send channel 64, initiated at microphone 54, and receive channel 66, terminated at speaker 56. For send channel 64, sound signals are first converted to electrical signals by microphone 54. Send-side conditioning 68, which may include filters, amplifiers, an analog-to-digital converter (ADC), a time-to-frequency converter (such as an FFT algorithm) and the like, prepare the microphone signal for send-side processing. Send side processing may include acoustic echo cancellation (AEC) 70, which processes the outgoing and incoming signals to reduce acoustic echoes caused by the environment in which handset 52 is operating. Additional send-side processing 72 may include automatic level tuning (ALT), noise cancellation (NC), compression, spectral shaping, encoding, and the like.

Handset receive-side channel 66 converts an analog electrical signal to sound using speaker 56. Receive-side conditioning 74 generates the analog signal using elements which may include filters, amplifiers, a digital-to-analog converter (DAC), a frequency-to-time converter (such as an IFFT algorithm) and the like. Receive side processing may include frequency expander 76 (FEX) for generating frequency components lost or attenuated by transmission through limited bandwidth interconnection system 22. Additional receive-side processing 78 may include acoustic shock protection (ASP), dynamic audibility enhancement (DAE), noise cancellation (NC), automatic level tuning (ALT), decompression, spectral shaping, decoding, and the like.

Together, send-side algorithms 70, 72 and receive-side algorithms 76, 78 comprise a set or suite of handset sound enhancement algorithms, shown generally by 80, that cooperate to improve the quality of sound generated by speaker 56 and/or received from microphone 54. Preferably, handset suite 80 is implemented by a digital signal processor within handset 52. However, as will be recognized by one of ordinary skill in the art, algorithms within suite 80 may be implemented by one or more of software executing on a processor, discrete analog components, discrete digital components, programmable logic devices, custom integrated circuits, and the like. As will be described in greater detail below, algorithms within suite 80 may be selectively placed into or removed from channels 64, 66. This switching may be accomplished by various flow control commands in software or by analog or digital switches in hardware, as is known in the art. Switching includes the possibility of selecting between algorithms within suite 80 for accomplishing the same task. For example, suite 80 may implement different noise cancellation algorithms for single microphone input, dual microphone inputs and array microphone inputs. Switching also includes setting parameter values within one or more algorithms of suite 80. Parameter values which may be set include time-domain filter coefficients, frequency-domain equalization coefficients, noise cancellation decay factors, weighting factors in signal summers, sampling rates, number of frequency bins, ranges of frequency bins, time window lengths, envelope shape coefficients, bit rates, and the like.

Handset 64 includes wireless interface 63 capable of transmitting receive-side channel 66 to headset 38, receiving send-side channel 64 from headset 38, or both over link 40. Typically, receive-side channel 66 is sent either to speaker 56 in handset 52 or over link 40 to speaker 60 on headset 38. Also, typically, send-side channel 64 receives signals either from microphone 54 on handset 52 or from microphone 58 on headset 38 over link 40. This selection is illustrated by logical receive-side switch 82 and logical send-side switch 84, respectively. However, it is possible to configure handset 52 for driving speaker 56 on handset 52 and speaker 60 on headset 38 simultaneously. It is also possible to configure handset 52 for receiving sound signals from both microphone 54 on handset 52 and microphone 58 on headset 38 such as, for example, to provide multiple microphones for noise cancellation. In such systems, it may be desirable to locate switches 82, 84 such that AEC 70 and FEX 76 do not affect signals communicated between handset 52 and headset 38.

Headset 38 includes wireless interface 90 for communicating with wireless interface 63 on handset 52. Headset 38 may also be connected to handset 52 with a wired connection. In the embodiment of headset 38 illustrated in FIG. 2, wireless interface 90 supports both send-side channel 64 and receive-side channel 66 within headset 38. Headset send-side channel 64 includes send-side conditioning electronics 92 receiving input from microphone 58. Headset AEC 94 reduces echoes produced by the environment in which headset 38 is operating. Additional headset send-side processing 96 may include automatic level tuning (ALT), noise cancellation (NC), compression, spectral shaping, encoding, and the like. Headset receive-side channel 66 drives headset speaker 60 from headset receive-side conditioning 98. Headset FEX 100 provides frequency expansion. Additional headset receive-side processing 102 may include acoustic shock protection (ASP), dynamic audibility enhancement (DAE), noise cancellation (NC), automatic level tuning (ALT), decompression, spectral shaping, decoding, and the like.

Collectively, sound enhancement algorithms 94, 96, 100, 102 make up a headset suite of algorithms, shown generally by 104, which cooperate to enhance one or both of send-side channel 64 and receive-side channel 66 in headset 38.

Various headsets 38 may be interfaced with handset 52. Each headset 38 may have different components making up its headset suite 104. Also, different algorithms may be used for corresponding elements in handset suite 80 and headset suite 104 and amongst various headsets 38. For example, headset 38 may implement a different noise cancellation algorithm than is implemented in handset 52. It is also possible that some headsets 38 for use with handset 52 may not include any elements of headset suite 104. The flexibility of placing different sound processing in headsets 38 and handsets 52 results in a potential performance cost. In particular, the use of headset 38 together with handset 52 may duplicate various sound enhancement operations. This duplication of operations can have a sever impact on the performance of the system as a whole. For example, sound quality drops when either or both of channels 64, 66 are over processed, resulting in a perceived signal that is worse than if no sound enhancement processing had occurred at all.

To overcome the possibility of overprocessing while flexibly allowing various types of headsets 38 to be used with handset 52, the present invention selectively processes channels 64, 66 within handset 52 based on headset suite 104. In the embodiment shown, wireless interface 90 on headset 38 notifies wireless interface 63 on handset 52 over link 40 as to the makeup of headset suite 104. Wireless interface 63 then generates control signals 110 which selectively include or exclude elements of handset suite 80 for processing channels 64 and 66 within handset 52.

Various schemes for notifying handset 52 about headset suite 104 are possible. For example, each of a limited number of configurations for headset suite 104 can be assigned an identifier which is transmitted over link 40. In another possible scheme, a model number describing headset 38 is transmitted over link 40. Yet another scheme involves assigning each algorithm class or mode a unique code. This code is transmitted together with an identifier for the specific algorithm within the mode. For example, noise cancellation, acoustic shock protection and automatic level tuning are all possible modes. Additional information may accompany each code, such as version number, algorithm parameters, sensed environmental parameters, sensed signal parameters, and the like.

Various techniques for transmitting the notification information from headset 38 to handset 52 are also possible. Inband signaling may be used. For example, one or more low power watermark signals may be added to send-side channel 64 by headset wireless interface 90. These watermark signals are read and, possibly, removed by wireless interface 63 in handset 52. Another possibility is out-of-band signaling. This can include side bands or orthogonally modulated signals transmitted over link 40, as is known in the art.

Another technique for transmitting notification information utilizes the discovery process for establishing link 40 between headset 38 and handset 52. For example, the Bluetooth standard includes a Service Discovery Application Profile defining a Service Discovery Protocol (SDP). Handset 52 functions as a Bluetooth local device and headset 38 as a Bluetooth remote device. In these roles, handset 52 initiates a service discovery procedure. Headset 38 responds to service inquiries by supplying data from a service records database, which may be implemented in nonvolatile memory within headset wireless interface 90. Bluetooth supports various scenarios including search for services by service class, search for services by service attributes, and service browsing by handset 52.

In addition to controlling algorithms in handset suite 80, handset wireless interface 63 may also control operation of algorithms in headset suite 104. Wireless interface 90 generates control signals 112 for selectively controlling algorithms in headset suite 104. After receiving information from headset 38 about the contents of headset suit 104, handset wireless interface 63 generates commands over link 40 instructing headset wireless interface 90 as to which algorithms in headset suite 104 to activate. This control may be used, for example, to deactivate algorithms in headset suite 104 if handset 52 determines handset suite 80 can provide superior sound processing due to better algorithms, increased processing power, better information about the environment, and the like. Handset 52 may also take over some or all sound enhancement processing due to changes in conditions within headset 38 such as, for example, to conserve power in headset 38 based on low battery indication signal 114. Control may also be used to adjust parameters of one or more algorithms in headset suite 104. This may be used, for example, to permit partial processing of the same type or mode in both handset 52 and headset 38.

Handset wireless interface 63 may also communicate with telephone system interface 62 over parameter link 116. In this manner, wireless interface 63 may provide an indication as to which algorithms in suite 80 and/or in suite 104 are being used for sound enhancement. This indication can then be relayed through interconnection system 22 for end-to-end setup of sound enhancement processing. Other information, such as algorithm parameters, equipment identifiers, operating conditions, and the like, may also be sent between handsets 52 through interconnection system 22.

The embodiment illustrated in FIG. 2 shows two devices, handset 52 and headset 38. However, the present invention will work with various configurations. For example, a hands-free kit that accepts a wireless telephone can communicate with a wearable headset. The hands-free kit could function as handset 52, headset 38 or both. If the first case, the hands-free kit could interface a telephone that does not implement the present invention or work together with a telephone implementing the present invention to interactively improve sound quality. In the second case, the hands-free kit could function as a headset by supplying or connecting to one or more microphones and speakers. The hands-free kit sends the telephone information about its sound processing capabilities. Similarly, other devices may operate as handset 52, headset 38 or both, such as personal digital assistants, personal computers, personal entertainment systems, automotive electronics, and the like.

Figure 3:
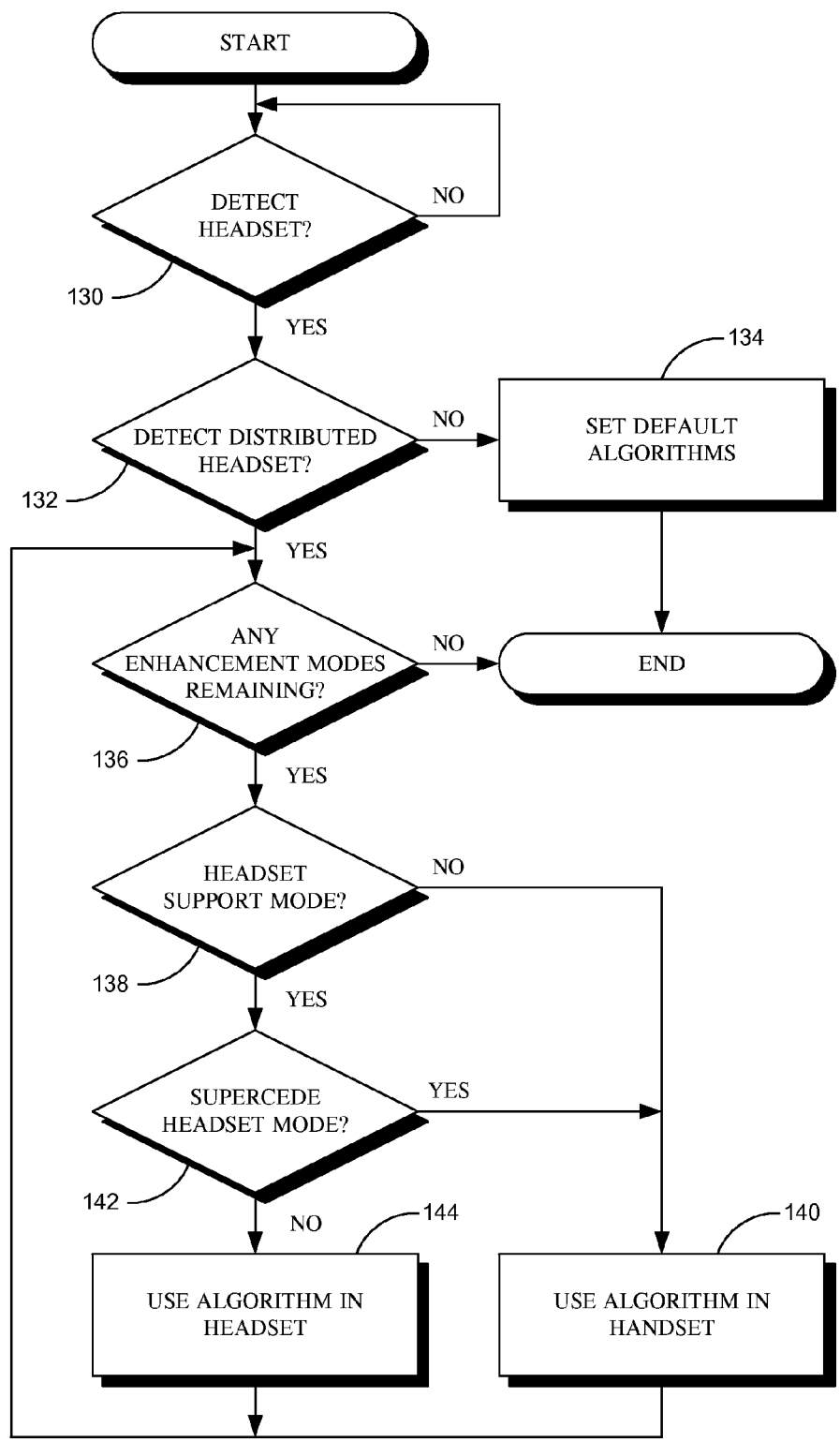
FIG. 3 is a flow diagram illustrating selecting sound enhancement algorithms for processing according to an embodiment of the present invention.

Referring now to FIG. 3, a flow diagram illustrating selecting sound enhancement algorithms for processing according to an embodiment of the present invention is shown. As will be appreciated by one of ordinary skill in the art, the operations illustrated are not necessarily sequential operations. The order of steps may be modified within the spirit and scope of the present invention and the order shown here is for logical presentation. Also, the method illustrated may be implemented by any combination of hardware, software, firmware, and the like, at one location or distributed. The present invention transcends any particular implementation and an embodiment is shown in sequential flow chart form for ease of illustration.

A check is made to determine if a headset is detected, as in block 130. If the headset connects to the handset via a wireline link, a jack switch may be used to determine the presence of a headset. If the headset and the handset are wirelessly connectable, the presence of a wireless link to a headset provides the necessary indication. If no headset is detected, the method repeats checking. This process may be implemented by polling, interrupt processing, or the like.

A check is made to determine if the connected headset supports distributed sound enhancement processing, as in block 132. The handset determines whether or not a linked headset supports the present invention based on signals received from the headset. If the headset does not support distributed sound enhancement processing, the handset sets its algorithms to a predetermined default configuration, as in block 134. This default configuration may be based, for example, on the assumption that a linked headset that does not support distributed sound enhancement processing performs no significant sound enhancement processing.

If the linked headset supports distributed sound processing, a check is made to determine which algorithm classes or modes are supported. This check is represented by the do-while loop implemented by block 136. Once all modes are checked, sound enhancement initialization is complete and coordinated sound processing may continue.

For each enhancement mode, a check is made to determine if the headset supports the mode, as in block 138. Typically, the headset supports a mode if the headset signals an algorithm implementing the mode is executable on the headset. If the headset does not support the mode, a corresponding handset algorithm is used, as in block 140.

If the headset supports the considered mode, a check is made to determine if the handset should supercede the headset mode, as in block 142. The handset may decide to use a handset algorithm even if a corresponding headset algorithm exists in the linked handset. This may occur, for example, if the handset determines that the handset algorithm is superior, that the handset possesses greater processing power, that the handset algorithm is better matched to other sound enhancement algorithms selected for use, that the headset is low on power, that the handset has better input signals for processing, or the like. If the handset mode supercedes the headset mode, the corresponding handset algorithm is used, as in block 140. If not, the corresponding headset algorithm is used, as in block 144.

Figure 4A:
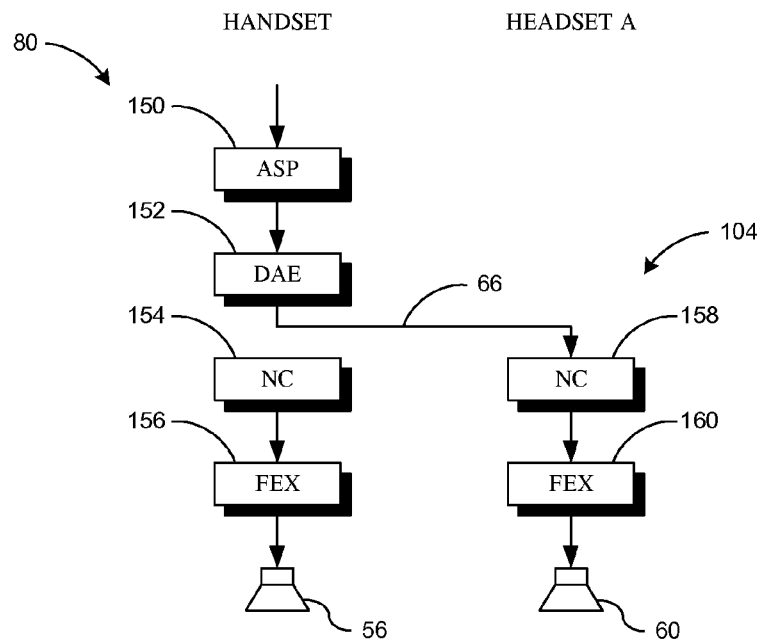
FIGS. 4a and 4b are block diagrams illustrating channel flow for different headsets according to an embodiment of the present invention.
Figure 4B:
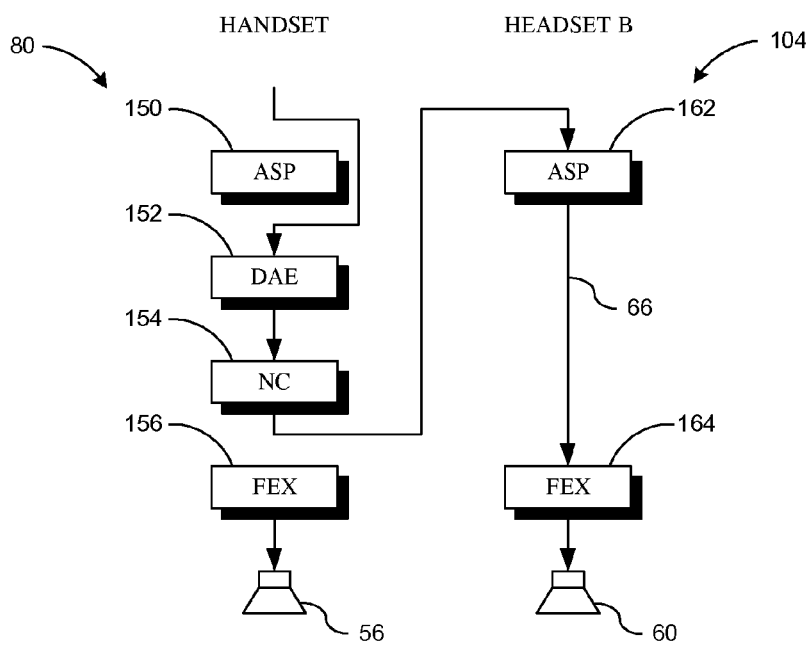

Referring now to FIGS. 4*a* and 4*b*, block diagrams illustrating channel flow for different headsets according to an embodiment of the present invention are shown. FIG. 4*a* depicts handset suite 80 including algorithms for handset acoustic shock prevention (ASP) 150, handset dynamic audibility enhancement (DAE) 152, handset noise cancellation (NC) 152 and handset frequency extension (FEX) 156. FIG. 4a also depicts Headset A suite 104 including algorithms for Headset A ASP 158 and Headset A FEX 160. Following initialization, receive-side channel 66 is configured to drive Headset A speaker 60 with a signal processed by handset ASP 150, handset DAE 152, Headset A NC 158 and Headset A FEX 160. This configuration results in noise cancellation and frequency extension being processed only at Headset A, avoiding duplicative processing.

FIG. 4b depicts the same handset suite 80 coupled with headset suit 104 belonging to a different headset, Headset B. Headset B suite 104 includes Headset B ASP 162 and Headset B FEX 164. In this case, following initialization, receive-side channel 66 is configured to drive Headset B speaker 60 with a signal processed by handset DAE 152, handset NC 154, Headset B ASP 162 and Headset B FEX 164. Duplicative processing of acoustic shock prevention and frequency extension is avoided by disabling these components in handset suite 80.

Figure 5:
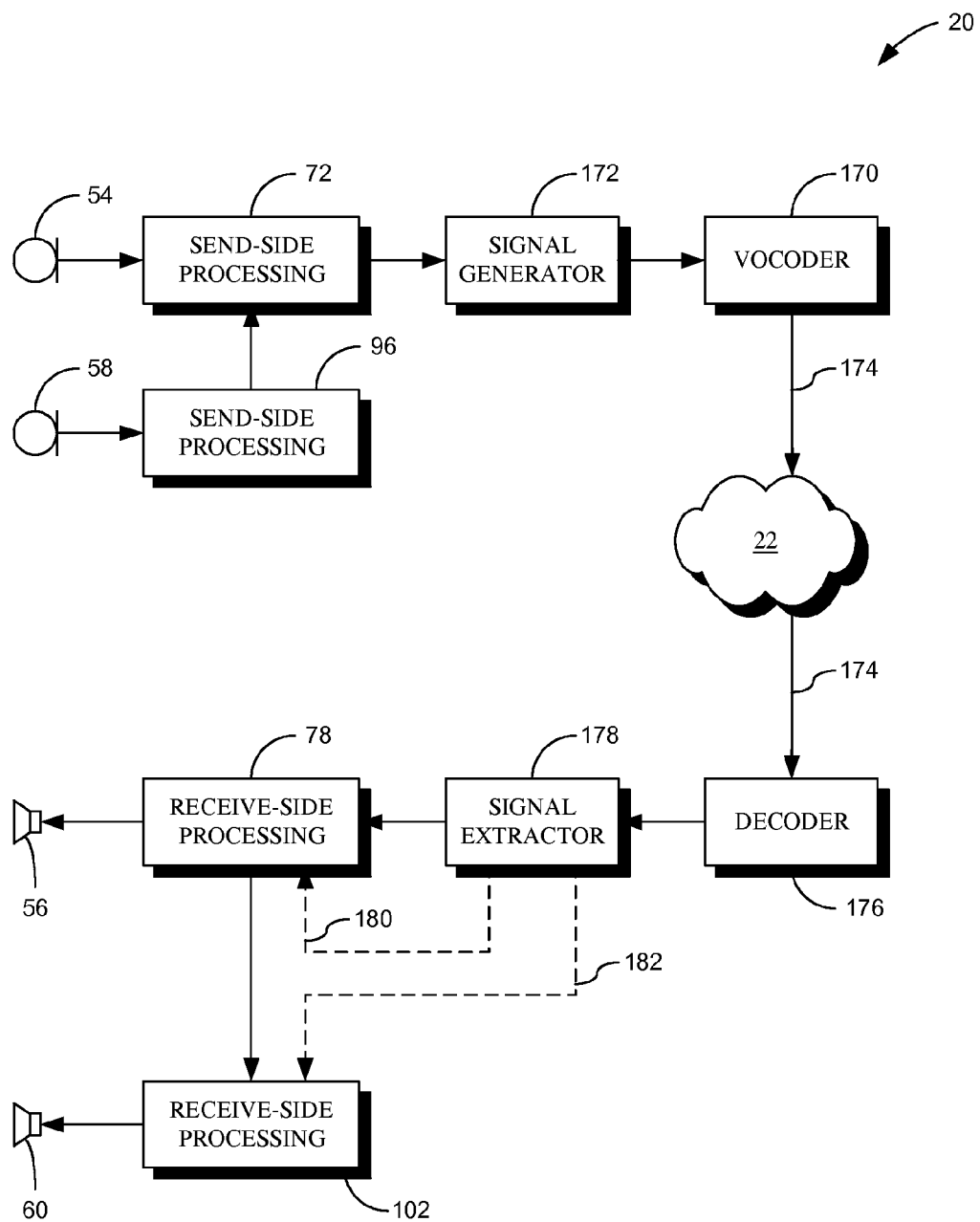
FIG. 5 is a block diagram illustrating end-to-end communication implementing sound enhancement according to an embodiment of the present invention.

Referring now to FIG. 5, a block diagram illustrating end-to-end communication implementing sound enhancement according to an embodiment of the present invention is shown. Experiments with both telephony vocoders and automated voice recognition systems show that such systems can be adversely affected by noise and that sound processing can improve the performance of such systems. However, optimal sound processing algorithms, such as noise cancellation, for use with automated recognition systems and vocoders may differ from optimal algorithms for use with human listeners. Furthermore, what is optimal prior to transmission over interconnection channel 22, which may perform its own processing, may differ from what is optimal after such transmission. Transmission over interconnection system 22 is improved by using information about send-side processing 72, 96 in determining one or both of receive-side processing 78 and receive-side processing 102.

In an embodiment, handset 52 includes vocoder 170 encoding signals generated from one or both of handset microphone 54 and headset microphone 58. Signal generator 172 generates a signal indicative of handset send-side processing 72 and, if used, headset send-side processing 96. The output of signal generator 172 may be, for example, a processed audio signal including one or more low power watermark signals indicating the processing performed, indicated by intercommunication signal 174. Signal generator 172 may also use out-of-band signaling and/or signaling used in initiating a connection over interconnection system 22. With reference as well to FIG. 2, signal generator 172 may be implemented as part of telephone system interface 62, wireless interface 63 or as a separate component. Signal generator 172 may receive information about one or both of handset send-side processing 72 and headset send-side processing 96 from wireless interface 63. It is also possible to locate some or all of the functionality of signal generator 172 and vocoder 170 in headset 38.

In the embodiment shown in FIG. 5, intercommunication signal 174 is received by decoder 176 and signal extractor 178 in a receiving handset 52. Decoder 176 decodes intercommunication signal 174. Signal extractor 178 extracts information about send-side processing 72, 96 from intercommunication signal 174. Signal extractor 178 uses information about send-side processing 72, 96 to determine handset receive-side processing 78 and, if applicable, headset receive-side processing 102. Signal extractor 178 generates control signal 180 indication the operation of handset receive-side processing 78. Signal extractor 178 generates control signal 182, sent over link 40, indicating the operation of headset receive-side processing 102. Decoder 176 and signal extractor 178 may be implemented in telephone system interface 62, wireless interface 63, or as separate components. In other implementations, some or all of the functionality of decoder 176 and signal extractor 178 may be implemented in headset 38.

In an exemplary application, send-side processing 72, 96 performs one or more algorithms for noise removal tuned to optimize the performance of vocoder 170, multi-band compression, time domain compression, spectral shaping for frequency band equalization, and/or other optimal pre-vocoder processing. A recipe designator transmitted through interconnection system 22 characterizes pre-vocoder processing applied to the audio signal. Signal extractor 178 detects the transmitted pre-vocoder processing recipe designator and generates one or both of control signals 180, 182.

Receive-side processing 78, 102 undertakes specific modifications to produce a post-vocoder (and post transmission) processing recipe that will be more optimal for a human listener. For example, receive-side processing 78, 102 can supply a small amount of additional noise removal, but without adding a great amount of additional noise reduction which would be objectionable to a human listener. Other possibilities are that receive-side processing might completely or partially undo the multi-band compression, time domain compression, spectral shaping, and/or other pre-vocoder processing applied to optimize performance of vocoder 170.

The present invention permits one or both of optimize the signal for vocoding and transmission on the send side as well as optimizing the received signal for human comfort on the receive side. Additional benefit may be achieved in duplex interconnection channels 22 by communicating receive-side processing 78, 102 to the receive side for affecting send-side processing 72, 96, permitting appropriate corrective and/or enhancement processing.

Figure 6:
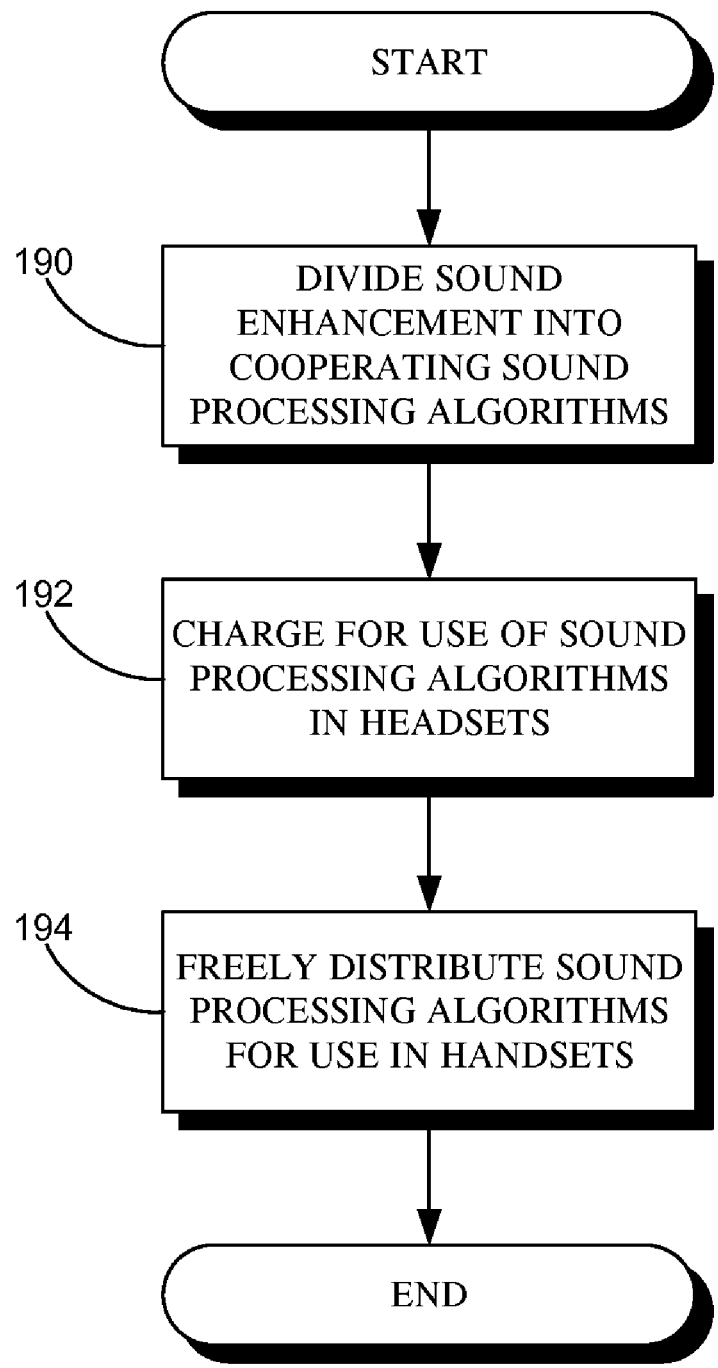
FIG. 6 is a flow diagram illustrating sound enhancement technology distribution according to an embodiment of the present invention.

Referring now to FIG. 6, a flow diagram illustrating sound enhancement technology distribution according to an embodiment of the present invention is shown. Once again, the operations illustrated are not necessarily sequential operations. The order of steps may be modified within the spirit and scope of the present invention and the order shown here is for logical presentation. The present invention transcends any particular implementation and an embodiment is shown in sequential flow chart form for ease of illustration.

Benefits of the present invention are most fully realized if both handset manufacturers and headset manufacturers agree on implementation details such as suite contents, format and methodology of information exchanged between handsets 52 and headsets 38, and the like. Handset manufacturers dominate the market, often setting standards independently or as subsets of the entire industry. While it is possible to implement different standards within each headset 38 to support each handset manufacturer, cost and complexity will be reduced if common implementation details are adopted.

One initial step is to divide sound enhancement into cooperating sound processing algorithms, as in block 190. Sound enhancement may be partitioned based on functionality, such as noise cancellation, acoustic shock prevention, echo cancellation, and the like. Sound enhancement may also be partitioned based on implementation, such as those algorithms implemented analogly or in particular processors. Still another set of partitions may be based on cost or performance thresholds. For example, a base headset may have no built-in processing. The next level up may include only echo cancellation. The next level up might add noise cancellation and frequency extension. The next level up might add acoustic shock protection. Once partitioning is decided, sound enhancement processing suites can be developed.

A charge will be included for the use of sound processing algorithms in headsets, as in block 192. Headsets 38 including sound enhancement suites 104 according to the present invention will provide superior sound quality and flexibility to users. Users will recognize these benefits and absorb the cost of implementing the present invention.

Sound processing algorithms for use in handsets will be freely distributed, as in block 194. If freely available, handset manufacturers will incorporate the present invention into handsets 52 since handset suite 80 will improve the performance of handset 52 whether or not handset 52 is connected to headset 38. In addition, the inclusion of handset suite 80 will provide increased flexibility for use of handset 52 with a wider variety of headsets 38.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of reducing duplicative sound enhancement processing in a communication channel implemented in a handset and a headset in communication with the handset, the method comprising:
    dividing sound enhancement processing into a plurality of cooperating algorithms;
    implementing at least a subset of the plurality of cooperating algorithms in the headset, wherein the implemented subset includes send-side acoustic echo cancellation, send-side noise cancellation, receive-side frequency expansion, and receive-side noise cancellation; and
    transmitting an indication of the implemented subset from the headset to the handset;
    whereby the handset can selectively determine a second subset of the plurality of cooperating algorithms to use in processing the communication channel so as to avoid repeating sound enhancement processing implemented in the headset.

2. A method of reducing duplicative sound enhancement processing in a communication channel as in claim 1 further comprising:
    receiving a control signal in the headset sent from the handset; and
    selectively disabling at least one of the cooperating algorithms in the headset based on the received control signal.

3. A method of reducing duplicative sound enhancement processing in a communication channel as in claim 1 further comprising:
    receiving a control signal in the headset sent from the handset; and
    selectively adjusting at least one parameter in at least one of the cooperating algorithms in the headset based on the received control signal.

4. A method of reducing duplicative sound enhancement processing in a communication channel as in claim 1 further comprising adjusting at least one parameter in the handset based on the indication of the implemented subset transmitted from the headset to the handset.

5. A method of reducing duplicative sound enhancement processing in a communication channel as in claim 1 further comprising adjusting at least one parameter in the handset based on the indication of an operating condition of the headset transmitted from the headset to the handset.

6. A method of reducing duplicative sound enhancement processing in a communication channel, the method comprising:
    dividing sound enhancement processing into a plurality of cooperating algorithms;
    implementing at least a subset of the plurality of cooperating algorithms in a sound transducing device, wherein the implemented subset includes send-side acoustic echo cancellation, send-side noise cancellation, receive-side frequency expansion, and receive-side noise cancellation; and
    transmitting an indication of the implemented subset from the sound transducing device to an interface device, the interface device operative to communicate with other interface devices through an interconnection system, the interface device operative to process sound signals;
    whereby the interface device can selectively determine a second subset of the plurality of cooperating algorithms to use in processing the sound signals so as to avoid repeating sound enhancement processing implemented in the sound transducing device.

7. A method of reducing duplicative sound enhancement processing in a communication channel as in claim 6 further comprising:
    receiving a control signal in the sound transducing device sent from the interface device; and
    selectively disabling at least one of the cooperating algorithms in the sound transducing device based on the received control signal.

8. A method of reducing duplicative sound enhancement processing in a communication channel as in claim 6 further comprising:
    receiving a control signal in the sound transducing device sent from the interface device; and
    selectively adjusting at least one parameter in at least one of the cooperating algorithms in the sound transducing device based on the received control signal.

9. A method of reducing duplicative sound enhancement processing in a communication channel as in claim 6 further comprising adjusting at least one parameter in the interface device based on the indication of the implemented subset transmitted from the sound transducing device to the interface device.

10. A method of reducing duplicative sound enhancement processing in a communication channel as in claim 6 further comprising adjusting at least one parameter in the interface device based on the indication of an operating condition of the sound transducing device transmitted from the sound transducing device to the interface device.

* * * * *